United States Patent
Koebbe

[11] Patent Number: 6,154,947
[45] Date of Patent: Dec. 5, 2000

[54] METHOD FOR MANUFACTURING A COVER FOR A CONNECTOR BAR AND THE COVER

[75] Inventor: Richard R. Koebbe, Cincinnati, Ohio

[73] Assignee: Eger Products, Inc., Amelia, Ohio

[21] Appl. No.: 09/024,277

[22] Filed: Feb. 17, 1998

[51] Int. Cl.[7] .................................................. B23P 25/00
[52] U.S. Cl. .............................. 29/458; 29/460; 264/301; 264/304
[58] Field of Search ..................................... 264/301, 304; 29/458, 460

[56] References Cited

U.S. PATENT DOCUMENTS

| | | |
|---|---|---|
| D. 317,434 | 6/1991 | McGrane . |
| D. 317,435 | 6/1991 | McGrane . |
| D. 320,381 | 10/1991 | McGrane . |
| 2,330,330 | 9/1943 | Beal et al. . |
| 2,384,055 | 9/1945 | Tritt . |
| 2,789,933 | 4/1957 | Bargmeyer . |
| 3,577,114 | 5/1971 | Hawkins . |
| 3,727,171 | 4/1973 | Coles et al. . |
| 4,297,153 | 10/1981 | Erickson et al. ......................... 264/301 |
| 4,417,394 | 11/1983 | Moody et al. . |
| 4,456,326 | 6/1984 | Sauber . |
| 4,470,786 | 9/1984 | Sano et al. . |
| 4,629,597 | 12/1986 | Charlebois et al. . |
| 4,946,405 | 8/1990 | Boehm . |
| 5,030,131 | 7/1991 | Boehm . |
| 5,137,476 | 8/1992 | Noble . |
| 5,199,905 | 4/1993 | Fillinger . |
| 5,201,678 | 4/1993 | Venezia . |
| 5,376,207 | 12/1994 | Pittman ..................................... 264/301 |
| 5,470,795 | 11/1995 | Shushurin . |
| 5,510,074 | 4/1996 | Rose . |
| 5,533,913 | 7/1996 | Boehm et al. . |
| 5,630,735 | 5/1997 | Eckert . |

Primary Examiner—S. Thomas Hughes
Attorney, Agent, or Firm—Dinsmore & Shohl LLP

[57] ABSTRACT

A method for manufacturing a plastic cover for a connector bar that includes providing a mold having a substantially rectangular shaped block, having a first surface and a second surface adjacent the first surface. Both the first and second surfaces each have at least one generally cylindrically shaped projection extending outwardly away from the respective surfaces. To form the plastic cover, the mold is dipped into a polymer solution and is allowed to dwell in the solution for a certain period of time. Next, the plastic cover is cured for a sufficient period of time so that the polymer solution hardens to form the plastic cover. After the cover is formed around the mold, it is removed from within the cover through a slit opening. After the mold is removed from the cover, a connector bar can be inserted through the opening into the cover's cavity.

27 Claims, 6 Drawing Sheets

METHOD FOR MANUFACTURING A COVER FOR A CONNECTOR BAR AND THE COVER

TECHNICAL FIELD OF THE INVENTION

The present invention relates generally to method for manufacturing a cover for a connector bar and the cover, and more specifically, to a method for quickly manufacturing the cover for a connector bar separate and apart from the connector bar that is used in aboveground pedestals.

BACKGROUND OF THE INVENTION

Aboveground power distribution pedestal box can be installed at intervals along a utility easement, such as in residential communities. Often, main power cables are run from one pedestal box to another, with the power cables terminating and connector bars located in each of the boxes. Connector bars are typically rectangular blocks of metals having openings for the main power line conductors or cable, and additional openings for distribution cable to residence or other dwellings, or to other utilities. Screws or other connection mechanisms are provided to secure the conductors or cables mechanically and electrically to the connector bar. Typically, each pedestal box contains three connector blocks since a three-wire residential distribution system is commonly used in residential communities.

It is often required that a connector bar be insulated, covered or encapsulated in a nonconductive material to prevent several problems. Since the pedestal boxes are outdoors, a connector bar preferably needs to be insulated from adverse weather, such as rain or snow, so that the power system does not fail due to an electrical short in the system. Additionally, it is also advantageous to insulate a connector bar and its associated wires from other connector bars and wires in the pedestal box. Electrical isolation of a connector bar reduces the possibility of cables, wire, or other connection means or the connector boxes from coming into electrical contact with each other and shorting out the power supply system. Furthermore, while a pedestal box is almost always covered and locked to prevent unauthorized entry, it is possible at times for individuals to come into contact with a connector bar, either intentionally or accidentally. Therefore, it is preferable and desired to provide a insulating cover for a connector bar to minimize the potential for electric shock.

Traditionally, there has been a plastic (e.g., PVC) insulated coating surrounding and insulating a metal connector bar. This plastic coating has been formed around and is fused or sealed to the connector bar. In order to properly coat the connector bar and form the ports, the connector bar, with its opening, must first be prepared. Preparation steps include inserting plug inserts into the screw and wire openings that plug or fill the hole, and extend outwardly away from the connector bar. In some applications, there are at least two screw openings and two wire openings in each connector bar that need to be filled or plugged with insert plugs. Thereafter, the connector bar is pre-heated and then is coated with a polymer material, usually by dipping the connector bar into the polymer material or solution for a predetermined time period. Next, the covered bar is cured (e.g., either by heat or other means) for a predetermined period of time so that the polymer material sufficiently hardens to form the cover and seizes or otherwise adheres to the connector bar's outer surface.

After the polymer is sufficiently cured, the ends or tips of the wire port(s) and screw port(s), which were generally formed around the plug insert are manually trimmed, or otherwise removed, which forms openings in the ports. Next, plug inserts are manually removed from the connector bar through the recently-formed openings.

However, the present method is labor intensive, which adds to the time and complexity of the manufacturing process, and is not entirely satisfactory. Moreover, since the plug inserts are formed to accommodate the variations in the openings size of connector, they must be adapted to be insertable into the smallest possible opening in the connector bar. As such, gaps are sometimes provided between the plug inserts and the openings when they do not fit securely, and the polymer solution can leak into these gaps during the cover forming process. As the cover cures, the leakage forms burr and other irregularities in the opening, which must be trimmed or otherwise removed, typically by hand, so that cables and attachment means (e.g., screws or bolts) can each be properly inserted into their opening without interference.

In addition, when the cover is formed directly on and fused to the connector bar, sometimes the process of curing or heating the polymer solution burns or otherwise discolors the connector bar, which can be unsightly and present a "dirty" appearance. Also, the repeated heating of a connector bar in the cover forming process causes unnecessary wear on the connector bar.

As can be appreciated, currently available plastic-covered connector bars for use in pedestal boxes have a number of shortcomings that contribute to the complexity and questionable quality of manufacturing. There exists a continuing need in the industry for a method for manufacturing covers for connector bars which can eliminate the wear and tear on the bar through the coating process. It is also desirable to provide an improved method of manufacture that eliminates many of the labor intensive steps currently involved in the manufacture of a cover for a connector bar. Furthermore, a need exists in the industry for a cover for a connector bar that is a separate structure and that is not adhered to the connector bar's outer surface.

SUMMARY OF THE INVENTION

It is an object of the present invention to provide a method of manufacture and cover for a connector bar that addresses and overcomes the above-mentioned problems and shortcoming in the industry.

It is another object of the present invention to provide a method of manufacture and cover for a connector bar that eliminates discoloration on the connector bar.

Yet another object of the present invention is to provide a method of manufacture and the cover for a connector bar that eliminates wear and tear on the connector bar in the cover manufacturing process.

Still another object of the present invention is to provide a method of manufacture and cover for a connector bar that reduces the need for labor intensive post manufacturing finishing work.

Another object of the present invention is to provide a cover for a connector that is durable and can be used in outdoor pedestal boxes.

An object of the present invention is to provide a method of manufacture and cover for a connector bar that reduces the need for labor intensive pre-manufacture preparation work.

A further object of the present invention is to provide a cover that is relatively moisture resistant.

Additional objects, advantages and other features of the invention will be set forth and will become apparent to those skilled in the art upon examination of the following, or may be learned with practice of the invention.

To achieve the foregoing and other objects, and in accordance with the purposes herein, the present invention comprises a method for manufacturing a cover for a connector bar that comprises providing a mold having a substantially rectangular shaped block having a first surface, and a second surface adjacent the first surface. Both the first and second surfaces each have at least one generally cylindrically shaped projection extending outwardly away from the surface. The mold can have at least one generally L-shaped aperture extending in the block, with each aperture terminating with an opening in each of the surfaces.

The cover is formed around the mold from the liquid polymer or plastic solution or material, such as a polyvinyl chloride (PVC) plastisol material. Prior to forming the cover, the outer surface of the mold can be treated with a releasing agent. Suitable releasing agents include water based agents (e.g., silicone), grease based, wax based, or others. The mold can be pre-heated before dipping the mold in a polymer, solution or material. Pre-heating the mold can involve heating the mold at a temperature from about 300° to about 700° F. (148° to 371° C.), and for a period of time from about 10 to about 40 minutes.

To form the cover, the mold is next slowly dipped into a polymer solution, and can be allowed to dwell in the solution for a period of time from about 10 to about 300 seconds. The mold can be withdrawn from the polymer solution at a rate from about 2 to about 8 inches (5 cm to 20.3 cm) per minute. The resulting cover can have a wall thickness from about 0.060 to about 0.250 inches (0.15 cm to 0.64 cm).

Next, the cover is cured, and such process can be assisted by heating the plastic cover, at a temperature from about 250° to about 500° F. (121 to 260° C.) for a period of time from about 6 to about 20 minutes.

After the cover is formed around the mold, it is removed from within the cover, preferably though an opening in the cover, while the cover is preferably at a temperature from about 125 and 400° F. (51 to 204° C.) to facilitate removal of the mold through the narrow slit opening. To assist in removing the mold from within the cover, air under pressure can be blown into the opening.

After the mold is removed from the cover, a connector bar can be inserted through the opening into the cover's cavity while the cover is at a temperature from about 125° to about 300° F. (51° to 148° C.). Optionally, the opening can be closed or otherwise sealed after the connector bar has been inserted. One suitable technique includes radio frequency welding.

The cover for use with a connector bar of the present invention includes a body portion that is preferably a substantially rectangular shape and is formed of a polymer material such as a PVC plastisol compound. The body includes a first surface, and a second surface being oriented substantially normal to the first surface. The body portion can have a wall thickness from about 0.060 to about 0.250 inches (0.15 cm to 0.64 cm), and further includes a generally rectangular shaped cavity within. At least one projection extends away from both the first and second surfaces, and each is integrally formed with the body and has an aperture extending to the cavity.

The cover can also include a third surface being oriented generally normal to the second surface and oppositely disposed from the first surface. An opening, such as a narrow slit, is provided along the third surface. In a preferred embodiment, fin projection can be also provided that extends away from the third surface, and includes a narrow slit opening along its distal edge.

BRIEF DESCRIPTION OF THE DRAWINGS

While the specification concludes with claims particularly pointing and distinctly claiming the present invention, it is believed the same will be better understood from the following description taken in conjunction with the accompanying drawings in which:

DETAILED DESCRIPTION OF THE PREFERRED EMBODIMENTS

Figure 1:
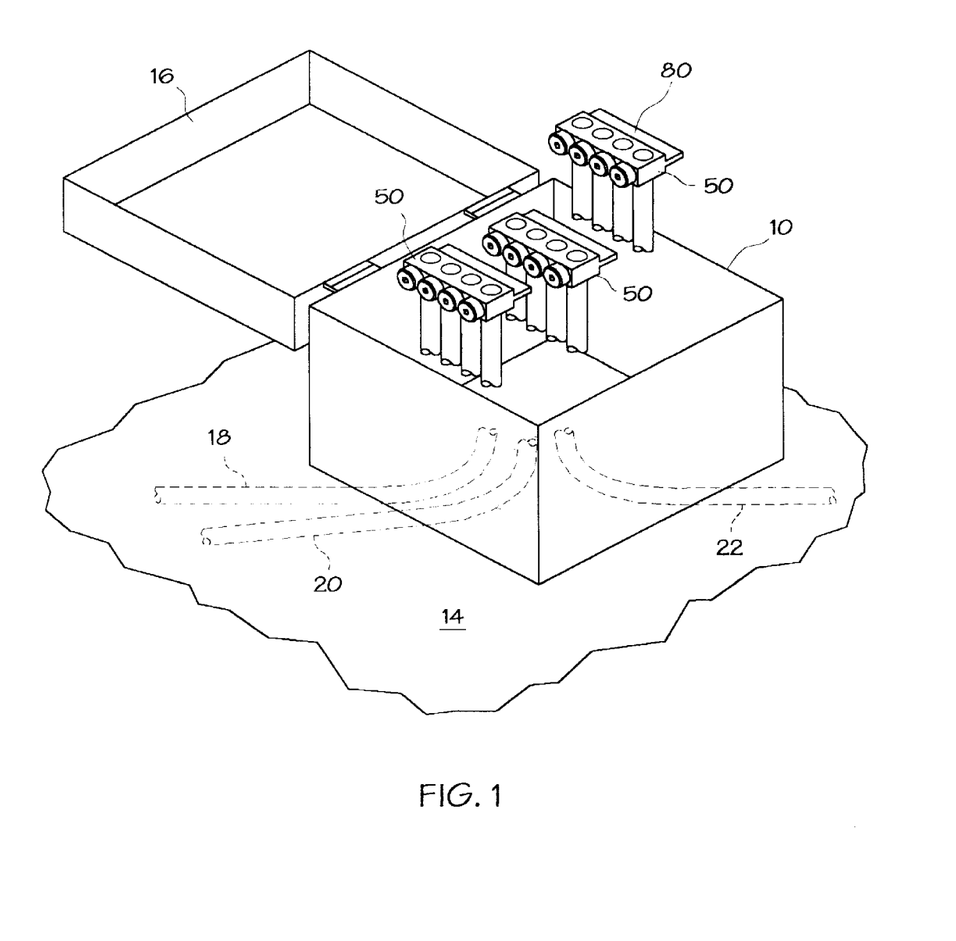
FIG. 1 is a prospective view of a pedestal box showing use of a covered connector box.

Referring now to the drawing figures in detail, wherein like numerals indicate the same elements throughout the views, FIG. 1 illustrates a pedestal box 10 mounted above the surface 12 of the ground 14. The box 10 is illustrated as containing three connectors (e.g., 50). Moreover, the box 10 may be provided with a hinged cover 16 to provide access to the connector bars within, and a locking mechanism (not shown) to prevent unauthorized entry. Connector bars 50 can be preferably situated in the box 10 at different horizontal levels, as illustrated, to facilitate access to the screws (not shown) which hold various cables in electrical and mechanical connection with a connector bar 80.

FIG. 1 further illustrates a single-power cable 18 entering the box 10 vertically from beneath the ground 14 and being attached to a connector 50. A continuing power cable 20 is illustrated descending into the ground 14 and then extending horizontally beneath the surface 12 toward, for example, another pedestal box. A service distribution cable 22 is also shown extending downwardly away from the connector 50 and then extending horizontally. While only one set of main power cables (e.g., 18 and 20) is illustrated for purposes of clarity, it is understood that there will be additional sets, likely three sets, of main power cables in a typical installation of a pedestal box 10. Likewise, there will be at least one, and usually several, service distribution cables (e.g., 22) extending from each connector 50 in a pedestal box 10.

Figure 2:
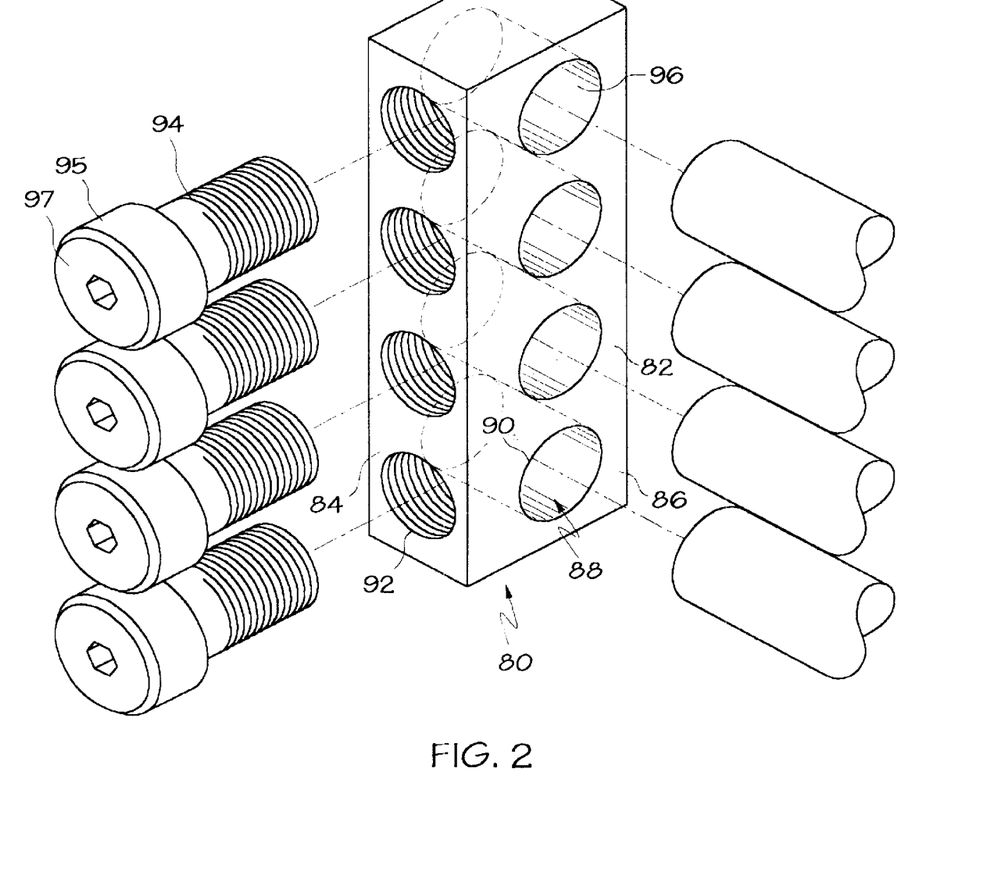
FIG. 2 is an exploded prospective view of the connector bar with attachment means that is insertable into the cover of the present invention.

Turning now to FIG. 2, connector bar 80 can be formed from a generally metal rectangular shaped main body portion or block member 82 and can include several enlarged openings 90 and 92, preferably generally circular shaped, on surfaces 84 and 86, respectively. The combination of openings 90 and 92 can result in the formation of a generally L-shaped aperture 88 extending through the body 82. As will be appreciated by those skilled in the industry, an aperture can also take the form of a V-shape or a T-shape. The block member 82 can be formed from extruded aluminum which is preferred so that the interior surface 96 is suitable for engaging the stripped portion of a cable and conducting electrical current. The openings 92 are slightly larger in diameter than cables (e.g., 18, 20, or 22), which can be as large as 500 mcm after having been stripped of their insulation. Openings 90 might be threaded or otherwise adapted to receive an attachment means 94.

Attachment means 94, such as bolts or screws with threaded exteriors, are provided for use with a connector bar 80 to assist in coupling or otherwise holding the cables in place in openings 92 and against the interior surface 96. The end 95 of each attachment means 94 is provided with an adjustment head 97, such as either a recess head to receive a suitable tool, such as an Allen wrench or screw driver, or a key or octagonal head to receive an adjustment tool, like a socket head wrench. Alternatively, end 95 might include a knurled head for finger manipulation.

Figure 3:
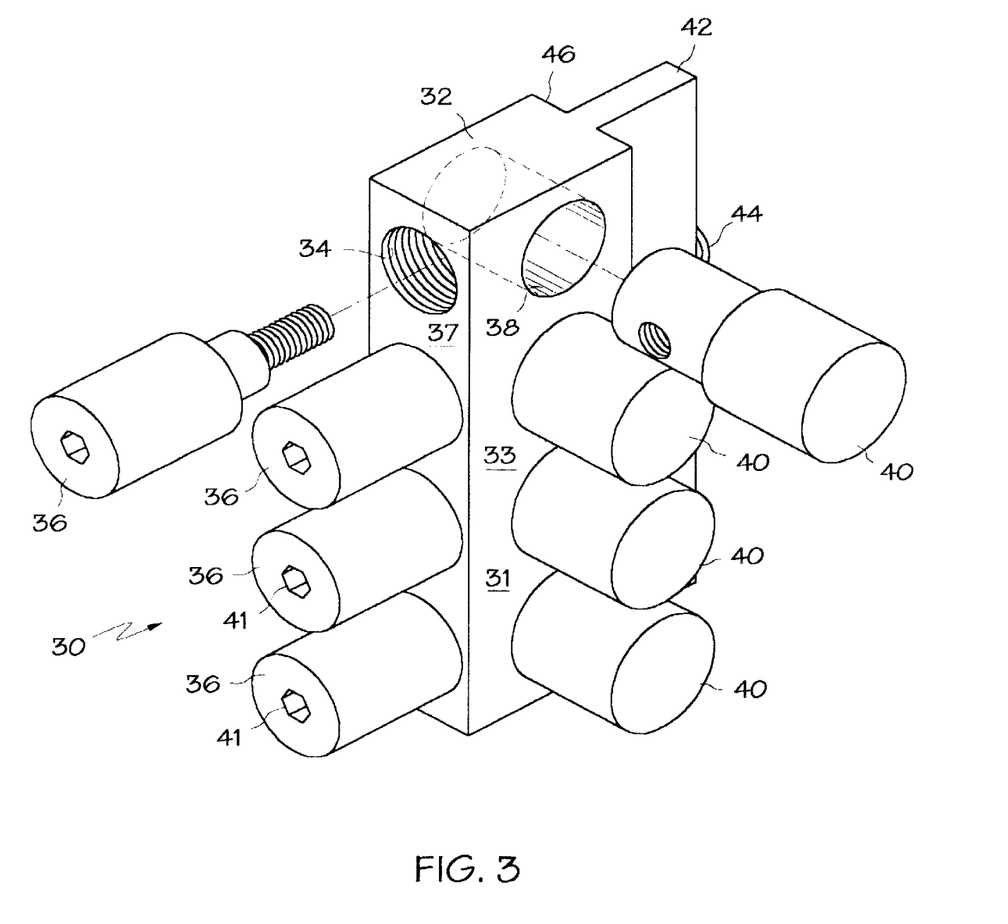
FIG. 3 is a prospective view of a preferred embodiment of a mold used in the method of the present invention to manufacture the cover of the present invention.
Figure 4:
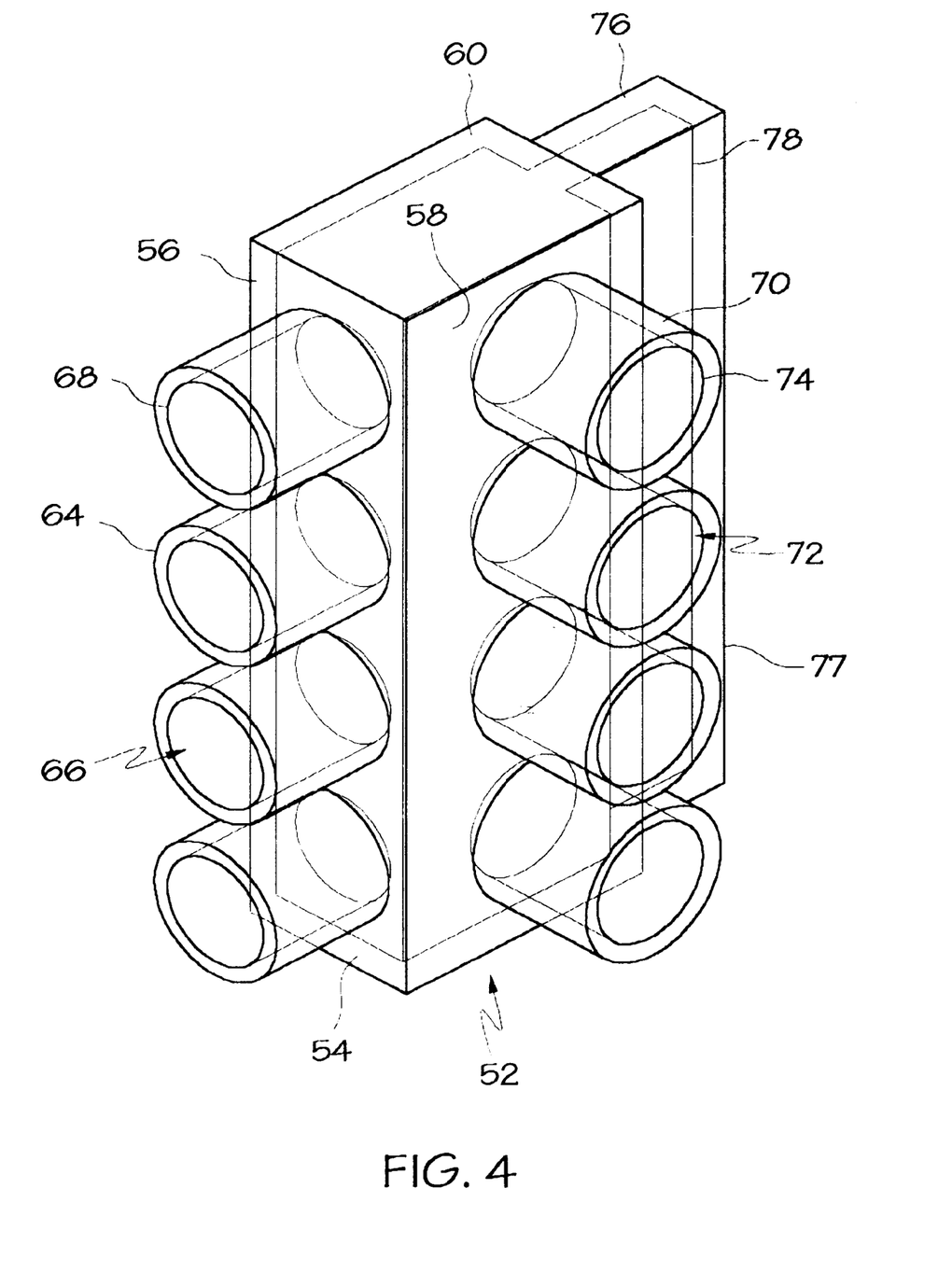
FIG. 4 is a prospective view of the cover manufactured in accordance with the present invention.
Figure 5:
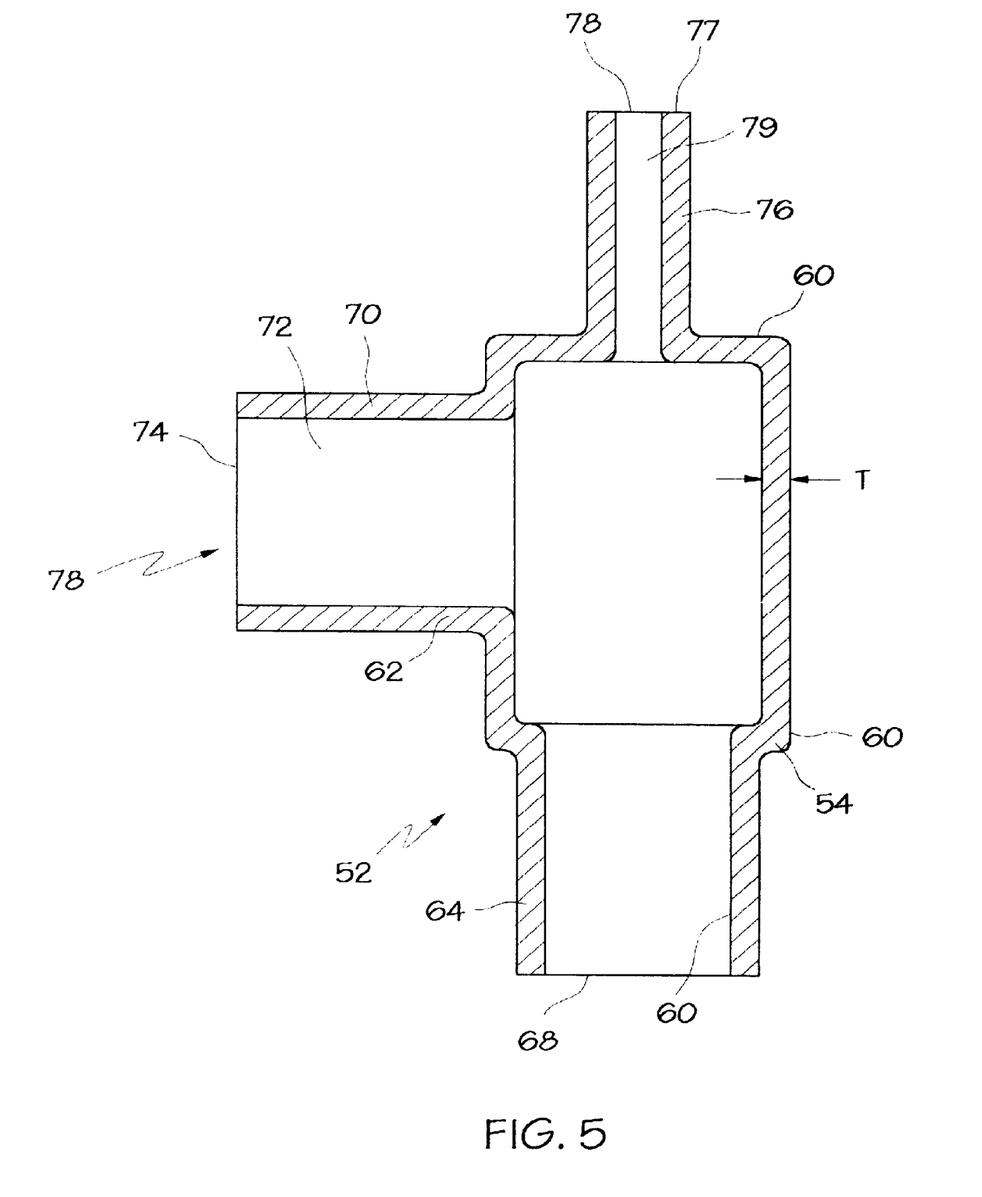
FIG. 5 is a vertical cross sectional view of a cover manufactured in accordance with the present invention.

As illustrated in FIG. 3, a mold 30 is provided for use with the present invention that corresponds substantially to the size and shape of the cavity 62 in the cover 52, illustrated in FIGS. 4 and 5. The mold 30 includes a substantially rectangular-shaped bar portion 32, at least one screw projection 36 that projects generally away from a first surface 33 of the bar 32, and, at least one wire projection 40 extends generally away from an adjacent surface 37 of the bar 32. FIG. 3 illustrates a preferred embodiment in which a plurality of screw projections 36 in a spaced relationship extending away from the surface 32, and a plurality of wire projections 40 in a spaced relationship that extend away from surface 37. The screw projections should be generally oriented to form screw ports 70 that generally align with or correspond to screw openings 92 in the connector bar 80. Likewise, the wire projections 40 should be generally oriented to form wire parts 64 that generally align with or correspond to wire openings 90 in the connector bar 80. This orientation will assist in inserting cables (e.g., 18, 20, and/or 22) through the openings 68 and 74 of the plastic cover 52, and into the openings 90 and 92 of the connector bar 80.

In one embodiment, the bar 32 and projections 36 and 40, respectively, can be integrally formed as a single unit. Alternatively, the bar 32 can be formed with screw apertures 34 and wire apertures 38 for receiving a portion of the screw projections 36 and wire projections 40 therein in an interlocked relationship. The outer diameter of each aperture 34 and 38 should be adapted so that the respective projections 36 and 40 snugly fit within the respective apertures. A snug fit assists in preventing leakage of the polymer material into the apertures while the mold is being formed. Moreover, a locking mechanism (not shown) should be provided for maintaining the respective projections 36 and 40 in their respective apertures 34 and 38 to further minimize leakage of a polymer material into the apertures. Preferably, mold 32 is formed of a metal material or other suitable material that can withstand being expanded to a temperature up to about 1000° F. (538° C.) without deforming.

Mold 30 can further include a fin portion 42, which is illustrated as an elongated, narrow projection coupled, or preferably integrally formed, that extends away from another surface 46 along a longitudinal length of the bar 32. Additionally, an attachment mechanism 44, such as a hook, should be provided on the mold 32, and preferably near or on the distal edge of the fin 42, as illustrated, so the mold 30 can be attached to a wire hook or like mechanism for dipping the mold 30 into a polymer material to form a cover 52, which also be explained in greater detail later herein.

FIGS. 4 and 5 illustrate a cover or boot 52 that is made with the present invention that has been formed to covered substantially the entire exterior surface of the connector bar 80. A generally rectangular shaped body or shell 54 is provided, or preferably, has been formed around a suitable shaped mold (e.g., 30). At least one generally cylindrical shaped wire port 64 is integrally formed with the body 54, and include at least one aperture 66 having an opening 68. Wire ports 64 also each should extend away from first surface 56 a sufficient distance to insulate the cables, especially the stripped portion, from each other, and from adverse environmental conditions, such as rain or snow. The cover 54 also includes at least one screw port 70, which is integrally formed with the body 54 and generally projects or extends away from a second surface 58. A thin projection 76 can be provided or formed integrally with a third surface 60 and includes a slit opening 78, preferably near or along its distal edge 77, that provides an aperture 79 extending from the slit opening 78 to the cavity 62 within the body 54. Cavity 62 is preferably adapted or configured to receive a connector bar 80 snugly therein.

The thickness "T" of the cover 52, as best illustrated in FIG. 5, can be generally consistent throughout, and can range from about 0.060 to about 0.250 inches. Such a thickness of the cover 52 provides a generally durable cover that can be used in outdoor pedestal boxes, such as the one illustrated in FIG. 1.

In practice, cables or other connector means will be brought into position adjacent to the connector 50 and inserted into one of the wire ports 64 through opening 68. Preferably, the insulation surrounding the cable will be trimmed or stripped to a position just below the first surface 84 of the connector bar 80. After a cable has been installed and brought into direct contact with the interior surface 96 of the connector bar 80, the attachment means 94 is tightened in the screw opening 92 to secure the stripped portion of a cable mechanically and electrically to the interior surface 96. If, in certain applications, all of the wire ports 64 are not being used in a certain application, the unused openings can be plugged with a screw or other plug assembly, such as a screw formed from an insulating material or otherwise covered to assist in preventing the circuit from being adversely affected.

In order to provide or form cover separate from the connector bar 80 in accordance with the present invention, such as the one illustrated as 52, a mold, similar to the one discussed above, and illustrated as 30, is provided. The outer surface 31 of the mold 30 is pre-treated with a releasing agent to assist in later preventing the cover from seizing or otherwise adhering to the mold's outer surface 31 during its manufacture, which will assist later in removal of the cover 52 from the mold 30. Suitable examples of a pre-treatment releasing agent would include water based agents (e.g., silicone), grease-based agents, wax-based agents, or other pre-treatment releasing agents known in the industry. Next, the mold 30 preheated, preferably in an oven, at a temperature from about 300° to about 700° F. (148° to 371° C.) for a period of time from about 10 to about 40 minutes.

Once the mold 30 has been pre-treated, it is covered with a polymer material. Suitable polymer materials include a polyvinyl chloride (PVC) plastisol compound with a durometer from about 50 to about 90 on the shore A scale. A preferred method of covering the mold 30 includes slowly dipping or immersing the mold 30 into a container of a polymer solution, and allowing it to be submersed or dwell for a set period of time, preferably from about 10 to about 300 seconds, depending on the desired wall thickness. The mold 30 needs to be submersed for a sufficient period of time so that a thin coating "T", from about 0.060 to about 0.250 inches, forms around the outer surface mold 30.

After a coating 52 of desired thickness has been formed around the mold 30, it is slowly removed or withdrawn from the polymer solution at a rate from about 2 to about 8 inches (5 cm to 26.3 cm), and preferably around 3.5 inches (8.9 cm) per minute. Then, the coating 52 is cured to solidify or harden the polymer solution forming the cover. To enhance the curing process, sometimes the covered mold 30 is placed into an oven at a temperature from about 250° to about 500° F. (121° to 260° C.) for a sufficient period of time (e.g., from about six to about twenty minutes) to enhance the curing (e.g., setting) of the polymer material.

Once the cover 52 has been sufficiently cured, the tips or end portions of each wire port 64 and screw port 70 are removed preferably by slicing or otherwise removing these end portions from the cover 52. While the cover is sufficiently elastic and having a temperature from about 125° to about 400° F. (51° to 204° C.), the mold 30 is removed from the cover 52 through the slit 78 provided by fin 76. In order to assist in removing the mold 30 from the cover, it is sometimes preferable to spray pressurized air between the slit 78 and fin 76 to assist in expanding the cover 52. Forcing pressurized air into the slit 78 also assists in preventing the cover 52 from sticking or otherwise adhering to the outer surface of the mold 30.

Figure 6:
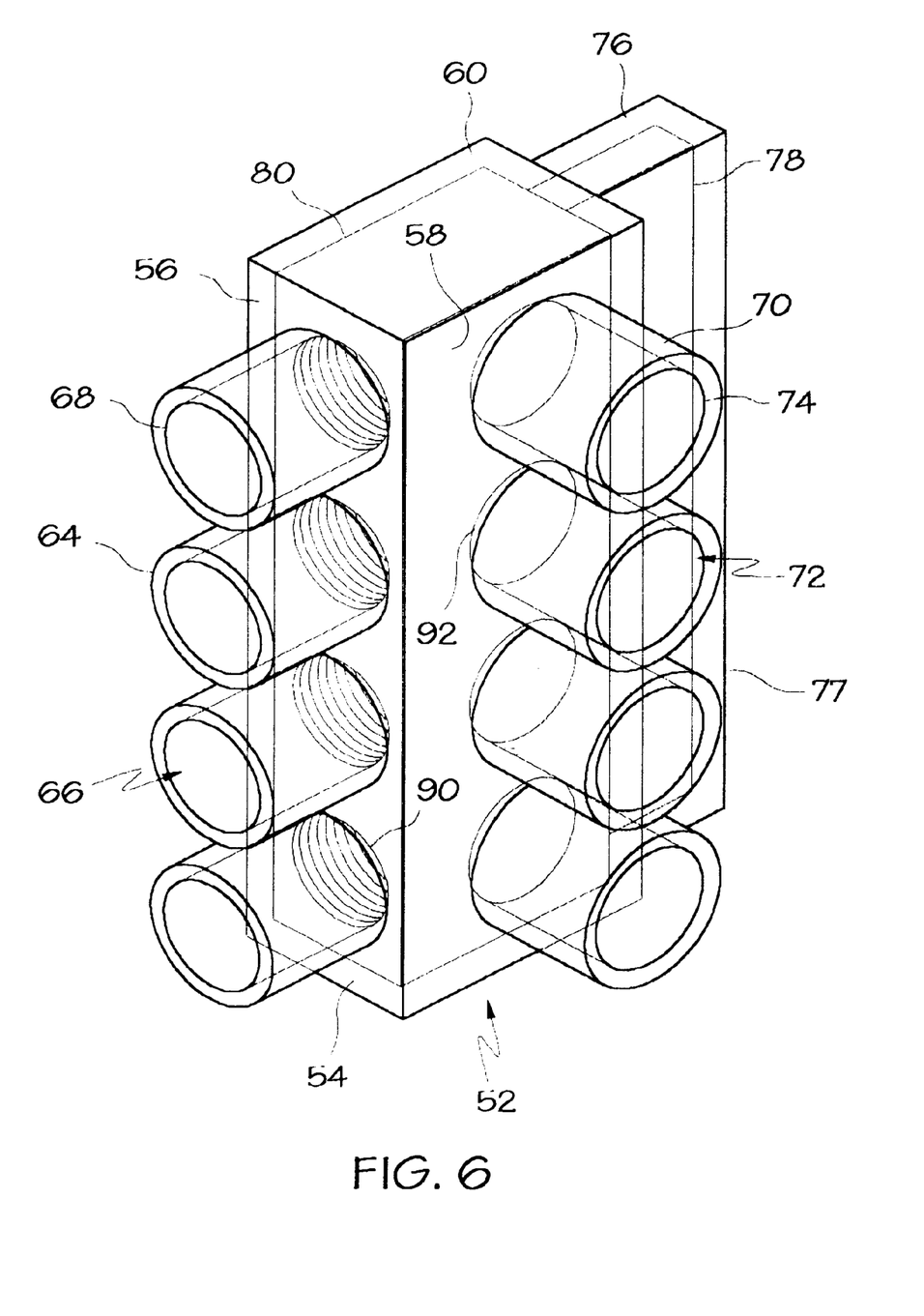
FIG. 6 is a perspective view of the cover manufactured in accordance with the present invention covering a connector bar.

After the mold 30 has been removed from the cover, and while the cover 52 is sufficiently elastic and malleable (e.g., the cover 52 being at a temperature from about 125° to about 300° F. (51° to 148° C.)), a connector bar, such as the one illustrated in FIG. 2 as 80 is inserted into the cover through slit 78, so that its openings 90 and 92 are aligned with the wire openings 68 and screw openings 74 as depicted in FIG. 6.

Additionally, after the connector bar 80 is inserted into the cover 52, the slit 78 can be sealed or stitched using various techniques in the industry. Suitable examples for sealing or stitching the slit 78 would include radio frequency welding, ultrasound welding, heat welding, mechanical fasteners, chemical bonding or others commonly known techniques and methods in the industry.

Having shown and described several preferred embodiments of the present invention in detail, it will be apparent that modifications and variations by one of ordinary skill in the art are possible without departing from the scope of the present invention defined in the appended claims. Several potential modifications have been mentioned and others will be apparent to those skilled in the art. The present embodiments being discussed and exemplified, both in the written description and drawing figures, are for use with the connector bar illustrated in FIG. 3. Nevertheless, it is contemplated that another connector bar could be used with the present invention if it is insertable through the slit, as illustrated in the drawing figures. Accordingly, the scope of the present invention should be considered in terms of the following claims and is understood not to be limited to the details of structure and operation shown and described in the specification and drawings.

I claim:

1. A method for manufacturing a cover for a connector bar from a polymer solution, the method comprising the following steps:

providing a mold having a substantially rectangular shaped block having a first surface and a second surface adjacent the first surface, the first surface having at least one shaped projection extending outwardly away from the first surface, and the second surface having at least one shaped projection extending outwardly away from the second surface;

forming the cover around said mold from the polymer solution, the cover having a first surface and a second surface adjacent the first surface, the first surface having an opening extending along its length, and the second surface having at least one port extending substantially away from the second surface; and removing the mold from the cover through the opening in the cover while the cover has a temperature from about 125 degrees to about 400 degrees F.

2. The method for manufacturing a cover of claim 1, wherein said step of forming the cover comprises forming a cover having a thickness from about 0.060 to about 0.250 inches.

3. The method for manufacturing a cover of claim 1, wherein said step of forming the cover comprises the steps of;

dipping the mold in a polymer solution; and curing the polymer covered mold.

4. The method for manufacturing a cover of claim 3, wherein said step of dipping the mold comprises allowing the mold to dwell in the polymer solution from about 10 seconds to about 300 seconds.

5. The method for manufacturing a cover of claim 3, wherein the step of dipping the mold comprises withdrawing the mold from the polymer solution at a rate from about 2 inches to about 8 inches per minute.

6. The method for manufacturing a cover of claim 3, wherein the step of forming further comprises the step of heating the mold before dipping the mold in the polymer solution.

7. The method for manufacturing a cover of claim 6, wherein said step of heating comprises heating the mold at a temperature from about 300° F. to about 700° F.

8. The method for manufacturing a cover of claim 6, wherein said step of heating comprises heating the mold in for a period of time from about 10 to about 40 minutes.

9. The method for manufacturing a cover of claim 6, wherein the mold is pre-treated with a releasing agent prior to heating the mold.

10. The method for manufacturing a cover of claim 3, wherein the step of curing comprises heating the cover at a temperature from about 250° to about 500° F.

11. The method for manufacturing a cover of claim 3, wherein said step of curing comprises heating the cover for a period of time from about 6 to about 20 minutes.

12. The method of manufacturing a cover of claim 1, wherein said releasing agent is silicone.

13. The method for manufacturing a cover of claim 1, wherein said step of removing the mold further comprises blowing air into said opening.

14. The method for manufacturing a cover of claim 1, wherein said step of providing a mold further comprises the step of:

providing the mold being a substantially rectangular shaped block having a first surface, a second surface being oriented substantially normal to the first surface, said mold having at least one L-shaped aperture extending therein, each aperture terminating with an opening in each of said surfaces, said mold further comprising a first plug being adapted to be snugly received through said first opening in said first surface, and a second plug being adapted to be snugly received throgh said second opening in said second surface.

15. The method of claim 1, comprising the step of providing an integrally formed mold.

16. The method claim 1, comprising the step of providing a fin on the mold.

17. The method of claim 16, comprising the step of providing the opening in the cover with the fin.

18. The method of claim 1, wherein the mold comprises a plurality of shaped projections extending outwardly from the first surface.

19. The method of claim 1, wherein the mold comprises a plurality of shaped projections extending outwardly from the second surface.

20. The method of claim 1, comprising the step of sealing the opening.

21. The method of claim 1 comprising the step of inserting a connector bar into the cover through said opening.

22. A method for manufacturing a plastic covered connector bar from a polymer solution, the method comprising the following steps:

provinding a mold having a substantially rectangular shaped block having a first surface and a second surface adjacent the first surface, the first surface having at least one generally cylindrically shaped projection extending outwardly away from the first surface, and the second surface having at least one generally cylindrically shaped projection extending outwardly away from the second surface;

forming the plastic cover around the mold from the liquid polymer, the cover having an opening;

removing the mold from the plastic cover through the opening while said cover has a temperature from about 125° to about 400° F.; and inserting a connector bar through said opening into the cavity of the cover.

23. The method for manufacturing a covered connector bar of claim 15, wherein said connector bar is inserted through said opening while said cover has a temperature from about 125° to about 300° F.

24. The method for manufacturing a covered connector bar of claim 15, comprising the step of sealing the opening.

25. The method of claim 22, comprising providing an integrally formed mold.

26. The method of claim 22, wherein the step of sealing the opening comprises heat welding the cover.

27. The method of claim 26, comprising the step of a connector bar while the cover has a temperature from about 125° to about 300° F.

* * * * *